W. R. METZ.
ELEVATING TRUCK.
APPLICATION FILED JUNE 10, 1912.

1,065,161.

Patented June 17, 1913.

2 SHEETS—SHEET 1.

Inventor
Walter R. Metz

Witnesses

By Meyers, Cushman & Rea
Attorney

W. R. METZ.
ELEVATING TRUCK.
APPLICATION FILED JUNE 10, 1912.

1,065,161.

Patented June 17, 1913.

2 SHEETS—SHEET 2.

Inventor
Walter R. Metz

Witnesses
H. C. Robinette
S. P. Hollingsworth

By Meyers, Cushman & Rea
Attorney

UNITED STATES PATENT OFFICE.

WALTER R. METZ, OF WASHINGTON, DISTRICT OF COLUMBIA, ASSIGNOR OF ONE-HALF TO WILLIAM F. MAHONY, OF WASHINGTON, DISTRICT OF COLUMBIA.

ELEVATING-TRUCK.

1,065,161.  Specification of Letters Patent.  Patented June 17, 1913.

Application filed June 10, 1912. Serial No. 702,815.

*To all whom it may concern:*

Be it known that I, WALTER R. METZ, a citizen of the United States, residing at Washington, in the District of Columbia, have invented new and useful Improvements in Elevating-Trucks, of which the following is a specification.

This invention relates to trucks generally, either hand or power operated, and particularly to an elevating attachment of simple construction for use on trucks either built for the purpose or which may be in common use, the application of the mechanism to the ordinary truck being easily performed with little or no change in the structure of the truck.

The object of this invention is to provide trucks, particularly hand trucks, with an elevating mechanism which, when not in use, lies flush with the top of the truck and out of the way of injury, but on turning a crank shaft, the elevating mechanism is raised above the top or deck. By this means materials to be transported can be piled on platforms supported on skids, legs or otherwise at a suitable height and the truck run under the platform. Then, by turning the crank shaft the elevating mechanism is raised and lifts the platform and its load from the skids or other supports whence the whole may be drawn to its destination and by a reverse rotation of the shaft the platform and load will be lowered onto suitable supports provided for the purpose and the truck withdrawn.

Figure 1:
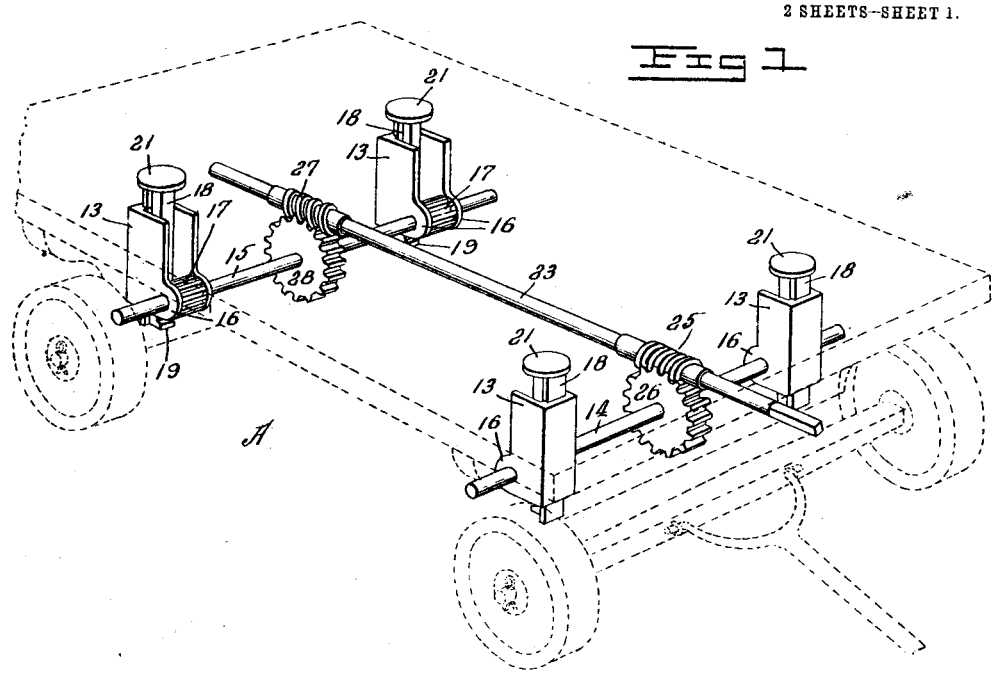
Figure 2:
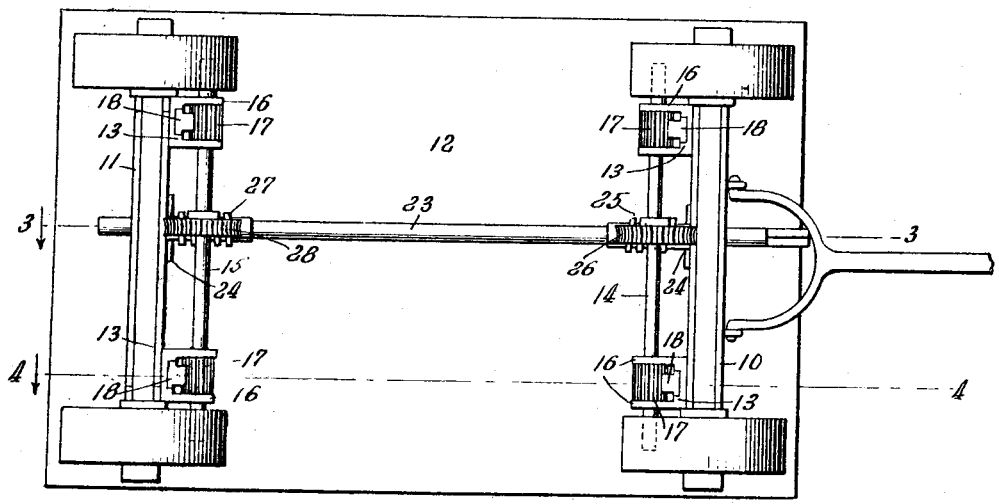
Figure 3:
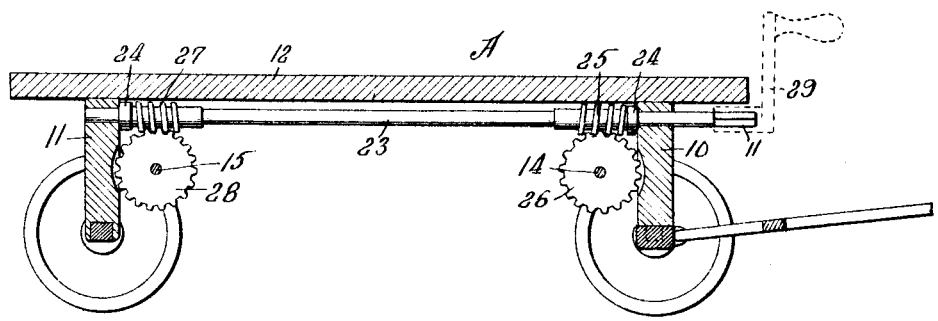
Figure 4:
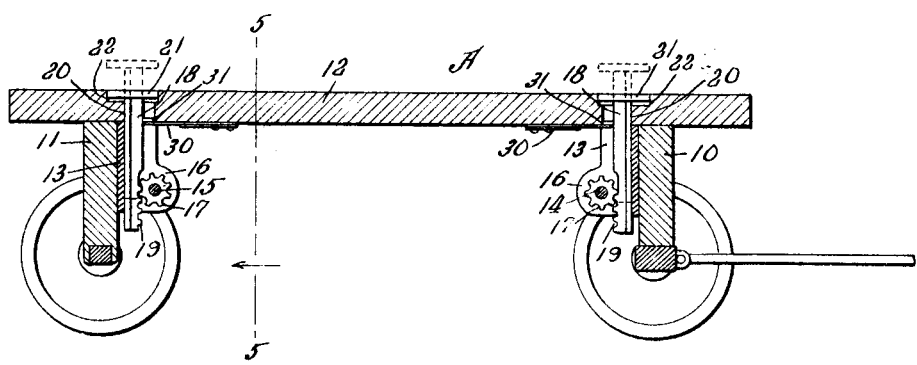
Figure 5:
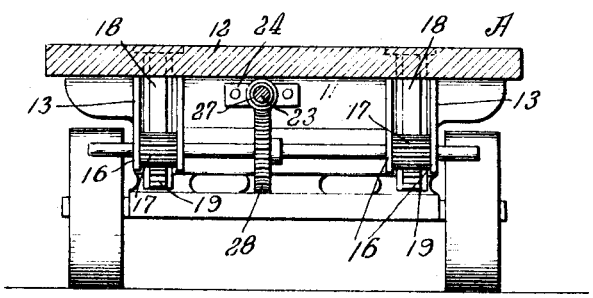

With this as the main object in view, the invention consists of the novel combination and arrangement of parts hereinafter described in detail, pointed out in the appended claims and illustrated in the accompanying drawings, in which:

Figure 1 is a perspective view of the elevating mechanism as applied to a truck, the truck being shown in dotted lines. Fig. 2 is a bottom plan view of the truck. Fig. 3 is a central longitudinal sectional view on the line 3—3 of Fig. 2. Fig. 4 is a longitudinal sectional view on the line 4—4 of Fig. 2. Fig. 5 is a cross sectional view on the line 5—5 of Fig. 4.

In the drawings wherein like reference characters are used to designate the same parts in all the figures, A indicates a truck which may be a hand or power truck of any suitable type, a four-wheeled hand-drawn platform truck being shown in the drawing, the front and rear axles being secured to transverse bolsters 10 and 11 respectively, rigidly fastened to the platform or deck 12. Bolted or otherwise fastened on the inner side of each bolster 10 and 11 are two guide bearings 13 in which are journaled transverse shafts 14 and 15, the shaft 14 mounted on the front bolster 10 and the shaft 15 on the rear bolster 11. The guide bearings 13 are fastened on the bolsters at any suitable distance from the sides of the platform 12, their exact location in this respect not being material. From each bearing 13 project two parallel plates or wings 16 that support the shafts 14 and 15 and between which plates or wings at each bearing is a pinion 17 fastened on the ends of the shafts.

Mounted to slide vertically in each bearing 13 is an elevating standard 18 having a short rack 19 on one side adapted to mesh with the pinion 17 carried in the same bearing. Each standard projects upwardly through a hole 20 in the platform 12 and is furnished on its upper end with a head 21, here shown in the form of a disk, which heads when the standards are in their lowermost position are seated in countersunk openings 22 in the platform so that the top surfaces of the heads are flush with the top of the platform and out of the way when the truck is loaded directly. It is to be noted that when the standards 18 are in their lowest position, the racks 19 are below and out of engagement with the pinions 17 for a purpose to be hereinafter described.

Extending longitudinally of the truck from front to rear just below the platform 12 and at some point between the guide bearings 13, preferably about the center of the truck, is a horizontal shaft 23 mounted in bearings 24 bolted on the inner sides of the bolsters 10 and 11. Fastened on the shaft 23 above the front shaft 14 is a worm 25 in engagement with a worm wheel 26 keyed on the shaft 14. A second worm 27 on the shaft 23 turns a worm wheel 28 keyed on the rear cross shaft 15. The front worm and worm wheel are, preferably, left-handed and the rear worm and wheel right-handed so that when the shaft 23 is rotated by a crank 29 fitted on the squared end thereof, the shafts 14 and 15 and the pinions 17 will be turned in opposite directions so that all the standards 18 will be raised or lowered simultaneously. Should the shafts 14 and 15 be placed both on the front side or both on the rear side of the racks 18, the worms and worm wheels would be alike, as is evident.

From practical experience, it has been found that when the racks 19 are made sufficiently long to continue in mesh with the pinions 17, there is great liability, when lowering the standards 18, to continue turning the crank 29 after the heads 21 of the standards are seated and further movement of the standards prevented. This effort to continue the operation strained the mechanism and caused breakage of the teeth. For this reason the number of teeth in the racks are limited to the absolute number required to raise the standards to a suitable height and which will pass out of engagement with the pinions when lowered. Such being the case, when it is desired to elevate the standards, some means must be provided to start them so as to bring the racks into engagement with the pinions. This means is a simple one and comprises a flat spring 30 fastened at one end to the underside of the platform 12 adjacent each guide bearing 13, the opposite free end of said spring projecting toward the standard 18 and held under tension by a pin 31 in the side of the standard pressing downward on said spring when the standard is in its lowest position. The tension of the springs tends to raise the standards, therefore, when the pinions are turned by means of the crank shaft and gearing in a direction to elevate the standards, the latter will be lifted by the springs sufficiently high to cause the teeth of racks 19 to engage the teeth of the pinion.

Attention is again directed to the fact that an ordinary four-wheeled platform truck can be quickly and easily changed to an elevating or vertical lift truck by boring four holes in the platform for the standards, holes in the bolsters for the longitudinal shaft and fastening the several bearings in the positions shown; and furthermore, a truck so changed may be continued in use as a platform truck by keeping the standards 18 lowered with their tops flush with the top of the platform.

What I claim is:

1. Combined with a truck having a flat top, a plurality of standards adapted to be moved in a vertical longitudinal direction above the top of the truck from a position flush with said top, means for raising and lowering said standards simultaneously, said means being automatically disconnected from the standards when the latter reach their lowest position, and means for engaging said standards with the elevating mechanism.

2. Combined with a truck having a flat top, a plurality of vertically disposed standards each having a load supporting end adapted to lie flush with the top of the truck and be raised above said top, a rack on each standard, a pinion adapted to engage each rack, means for simultaneously rotating said pinions to raise and lower the standards uniformly, said racks becoming disengaged from the pinions when fully lowered, and resilient means for engaging said racks with their pinions to raise the standards.

3. Combined with a truck having a platform top, a plurality of standards movable longitudinally and vertically through openings therein, each standard having an enlarged upper end arranged to seat in a depression in said platform flush with its upper surface, a short rack on each standard, a transverse shaft mounted in bearings at the front and rear of the platform, pinions on said shafts adapted to engage said racks to raise and lower the standards but normally disengaged from the racks when said standards are in their lowermost position, a longitudinal operating shaft, worm gearing between the longitudinal and transverse shafts, a projection on each standard, and a spring finger engaging said projection to raise the standard and engage the rack with its pinion.

In testimony whereof I have hereunto set my hand in presence of two subscribing witnesses.

WALTER R. METZ.

Witnesses:
M. J. McINERNEY,
WM. F. MAHONY.

---

Copies of this patent may be obtained for five cents each, by addressing the "Commissioner of Patents, Washington, D. C."